United States Patent
Brewen (12)

(10) Patent No.: US 6,396,793 B1
(45) Date of Patent: May 28, 2002

(54) PREHEATING BEAMS FOR OPTICAL RECORDING

(75) Inventor: Alan T. Brewen, Pittsford, NY (US)

(73) Assignee: Eastman Kodak Company, Rochester, NY (US)

(*) Notice: Subject to any disclaimer, the term of this patent is extended or adjusted under 35 U.S.C. 154(b) by 77 days.

(21) Appl. No.: 09/651,457

(22) Filed: Aug. 30, 2000

(51) Int. Cl.$^7$ .................................................. G11B 7/00
(52) U.S. Cl. ........................ 369/124.03; 369/124.04; 369/53.34
(58) Field of Search ..................... 369/44.37, 44.38, 369/47.15, 47.19, 47.28, 47.38, 53.31, 53.34, 59.11, 59.1, 116, 124.03, 124.04, 124.14

(56) References Cited

U.S. PATENT DOCUMENTS 5,757,735 A * 5/1998 Fitzpatrick et al. ......... 369/116
6,236,635 B1 * 5/2001 Miyamoto et al. .......... 369/116

* cited by examiner

Primary Examiner—Paul W. Huber
(74) Attorney, Agent, or Firm—Raymond L. Owens

(57) ABSTRACT

A method for optical data recording includes focusing a preheat laser beam and a recording laser beam onto an optical recording medium, forming a preheat focused spot and a recording focused spot having nearly equal sizes; providing relative scanning motion between the optical recording medium and the recording focused spot in a direction parallel to the displacement from the preheat focused spot to the recording focused spot at a velocity sufficient to prevent thermal diffusion from the optical recording medium during the transit of the medium from the preheat focused spot to the recording focused spot; and modulating the preheat laser beam according to a modulated data signal, thereby creating preheated zones on the media surface with temperatures less than a threshold for complete mark formation. The method also includes modulating the recording laser beam according to the modulated data signal, with a time delay equal to the separation between the preheat focused spot and the recording focused spot divided by the scanning velocity, and causing the recording laser beam to illuminate the recording focused spot with sufficient power to raise the temperatures of each preheated zone above the threshold for complete mark formation, creating a track of permanent recorded marks.

8 Claims, 4 Drawing Sheets

(Prior Art)

(Prior Art)

PREHEATING BEAMS FOR OPTICAL RECORDING

FIELD OF THE INVENTION

The present invention relates to optical recording using more than one laser beam to record a track.

BACKGROUND OF THE INVENTION

Optical recording consists of the controlled marking of a media surface using a focused and modulated laser beam. The laser beam heats regions of a recording layer to a media-specific critical temperature. In the regions so heated, the medium undergoes a visible change that may be subsequently detected under lower power illumination.

FIG. 1 illustrates a prior art optical recording process. The output of a recording laser 10 is modulated by data channel electronics 12. A focusing lens 14 focuses the modulated laser beam to a small recording spot 16 on the surface of an optical recording medium 20. The medium is scanned relative to the focused spot in a scanning velocity 18. The recording medium absorbs laser beam radiation and is heated locally in the vicinity of the focused spot. Visible recorded marks 22 form on the media surface at locations that have been heated above the critical temperature.

If the recording medium lacks sufficient sensitivity, or if the recording laser lacks sufficient power, the recording medium will nowhere reach the critical temperature and no marks will form. In FIG. 2 prior art, data channel electronics 12 modulate a laser beam from a low power source recording laser 10'. The laser beam is focused by lens 14 to form a recording spot 16' of reduced intensity on the surface of the recording medium 20. With reduced intensity, the spot heats the media surface to a lesser degree, resulting in recorded marks 24 that are smaller than the recording spot and irregular in size.

For many applications and system designs, the rate of optical recording is limited by the available laser power. It is well known that less recording power is required when the media is already hot. Thus, the effective media sensitivity may be increased by preheating (see U.S. Pat. Nos. 4,383,261 and 4,530,080).

One prior art method of preheating is shown in FIG. 3. A low power beam from recording laser 10' is modulated by data channel electronics 12. The laser beam is focused by a lens 14 to form a focused spot 16' with reduced intensity at the surface of the optical recording medium 20. A heating element 28 positioned upstream from the focused spot heats the media surface to a temperature lower than a critical recording temperature. The heated zone 30 of the medium extends at least to the focused recording spot. Because the laser heating is added to the preheating of the medium, the laser pulses create larger recorded marks 26. However, preheating also causes the mark shapes to be irregular in shape. The shape irregularity arises because local variations in media characteristics or recording system parameters are exaggerated when the thermal gradients across the medium are small during the recording event.

An alternative prior art method of preheating for optical recording is to provide a second focused optical spot that heats the medium immediately upstream from the recording spot, as in FIG. 4. A low power laser beam from recording laser 10' modulated by data channel electronics 12 is focused by the focusing lens 14 onto the recording medium 20. The beam from a second, unmodulated preheat laser 32 also passes through the focusing lens, creating a preheat spot 34 located immediately upstream from the recording spot. The width of the preheat spot is substantially the same as the recording spot. The preheat spot heats the medium to a temperature less than a critical marking temperature in a heated media zone 30' that extends to the recording spot 16'. In order to assure that the preheated media zone extends to the recording spot, the preheat spot must be closer to the recording spot than the scan velocity 18 multiplied by about 2 microseconds. The pulses of the recording laser create recorded marks 26 that have increased size because of the preheating. The irregularity of the mark shapes is reduced because the mark width is confined to the narrow preheated zone. However, preheating still causes some variability in mark length.

Unintended variation in recorded mark length and width degrades signal quality, inducing readout errors and limiting the storage capacity and channel performance of the recording medium.

SUMMARY OF THE INVENTION

It is an object of this invention to increase the effective media sensitivity for optical recording without substantially increasing the length irregularity of the recorded marks.

This object is achieved by a method for optical data recording, comprising:

a) focusing a preheat laser beam and a recording laser beam onto an optical recording medium, forming a preheat focused spot and a recording focused spot having nearly equal sizes;

b) providing relative scanning motion between the optical recording medium and the recording focused spot in a direction parallel to the displacement from the preheat focused spot to the recording focused spot at a velocity sufficient to prevent thermal diffusion from the optical recording medium during the transit of the medium from the preheat focused spot to the recording focused spot;

c) modulating the preheat laser beam according to a modulated data signal, thereby creating preheated zones on the media surface with temperatures less than a threshold for complete mark formation;

d) modulating the recording laser beam according to the modulated data signal, with a time delay equal to the separation between the preheat focused spot and the recording focused spot divided by the scanning velocity; and e) causing the recording laser beam to illuminate the recording focused spot with sufficient power to raise the temperatures of each preheated zone above the threshold for complete mark formation, creating a track of permanent recorded marks.

ADVANTAGES

It is an advantage of the present invention that effective high speed optical recording can be achieved using preheat laser beams without the need for high power laser sources.

It is another advantage that by practicing the present invention, high fidelity recording can be achieved.

It is a further advantage of the present invention that VSCEL arrays may be utilized for multitrack optical recording.

DETAILED DESCRIPTION OF THE INVENTION

Figure 1:
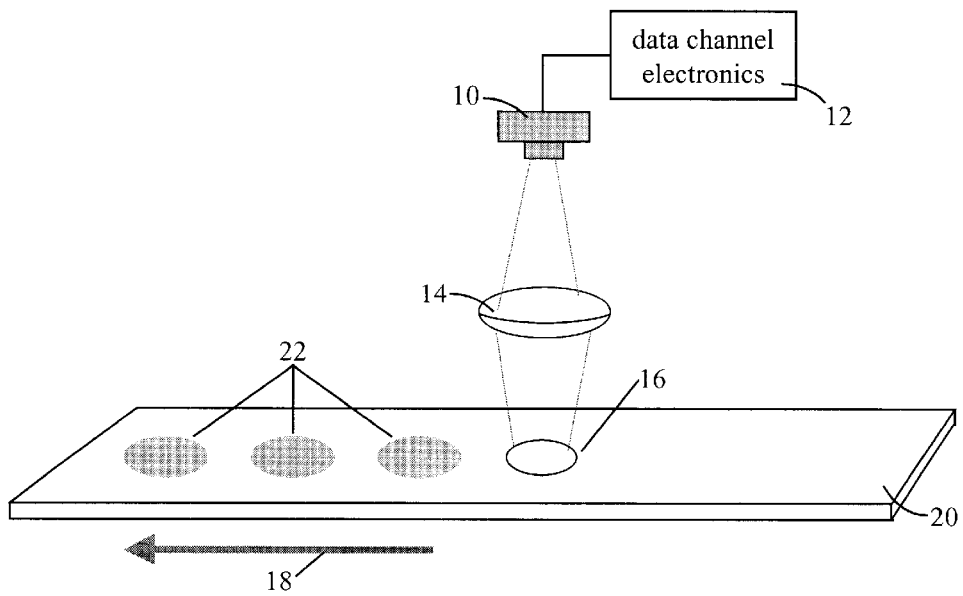
FIGS. 1 and 2 describe some features of the optical recording process according to the prior art.
Figure 2:
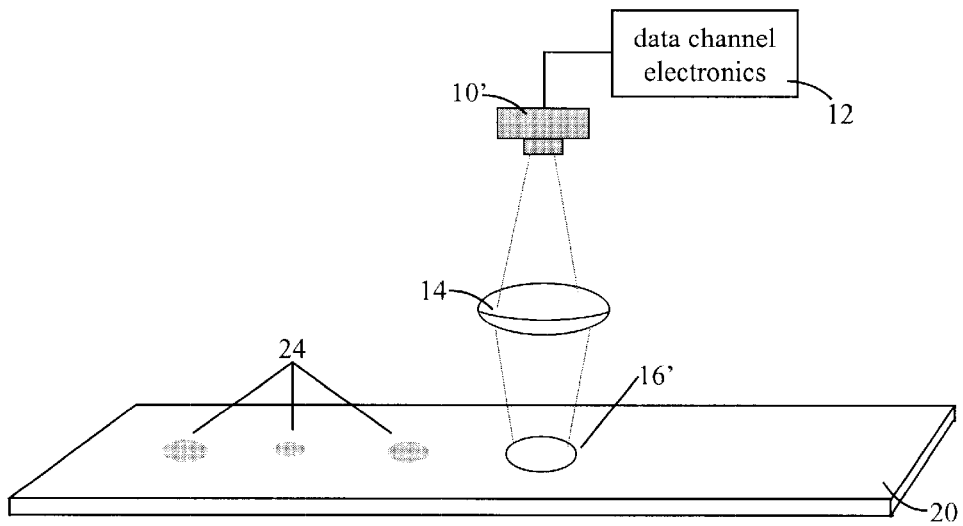
Figure 3:
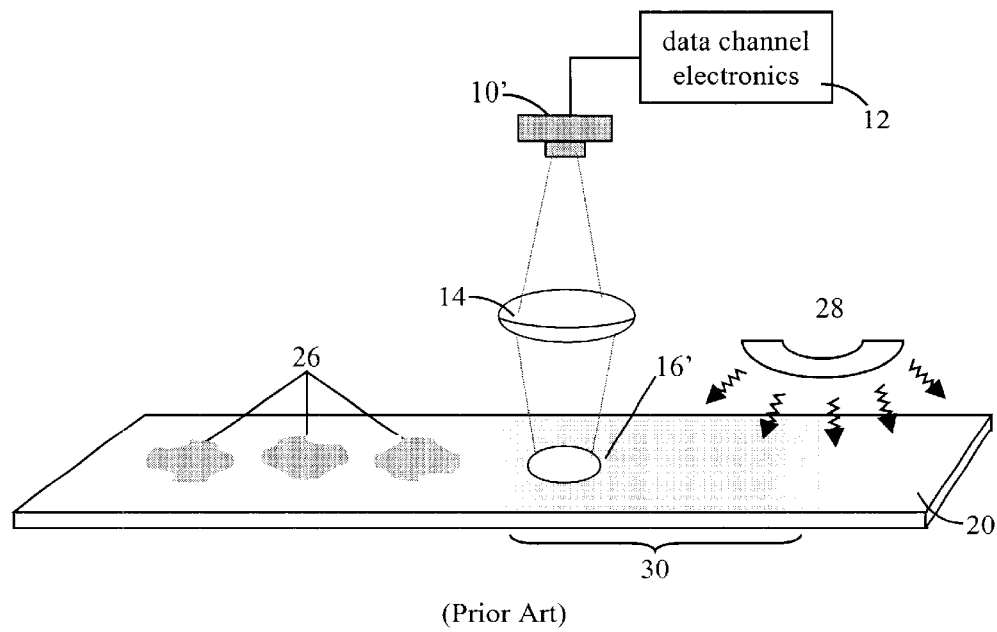
FIGS. 3 and 4 describe prior art methods of preheating to assist the optical recording process.
Figure 4:
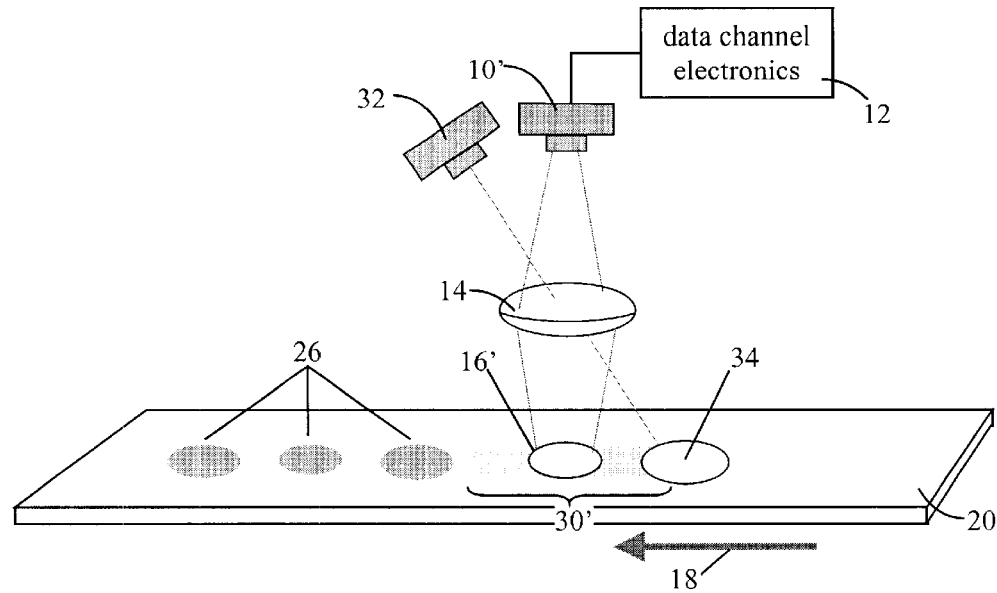

According to the present invention, media preheating is accomplished by one or more preheat beams that are focused upstream from the trailing record beam and modulated synchronously with the trailing record beam to selectively heat the same regions of the medium. The preheat spots have essentially the same size as the corresponding record spots, scan the same tracks on the media surface, and are modulated with the same data signal. But modulation delays are applied to the spots such that both preheat and record spots heat the same regions of the media. This eliminates the mark variability sensitivity that is inherent in prior art preheating methods.

In one implementation of this invention, both the record laser source and the preheat laser source(s) are elements of a Vertical Cavity Surface Emitting Laser (VCSEL) array 100. Use of a laser array assures that precise relative alignment can be maintained between the record and preheat spots (both cross-track and in-track). A two-dimensional VCSEL array may be used for multichannel optical recording, with independent synchronized preheating for each track.

Where parts correspond to prior art elements, the same reference numerals may be employed for clarity of illustration.

Figure 5:
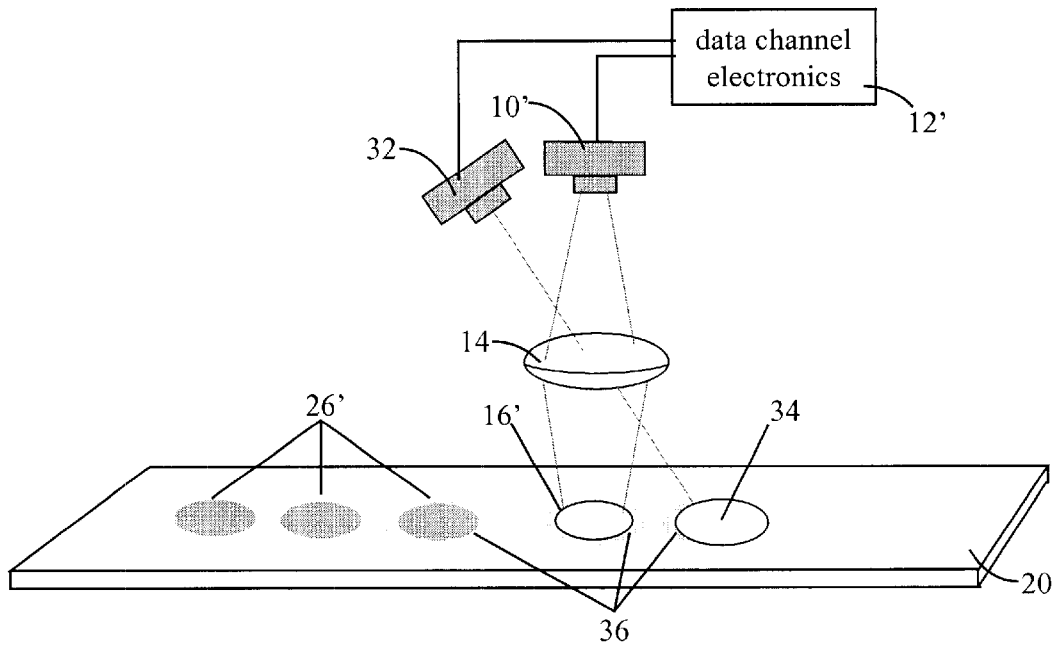
FIG. 5 shows how the reliability of preheating may be improved according to the current invention.

Referring now to the apparatus shown in FIG. 5, beams from recording laser 10' and preheat laser 32 are respectively focused through the focusing lens 14 onto the recording medium 20 forming a recording spot 16, and a preheat spot 34. Both the recording laser beam and the preheat laser beam are modulated by data channel electronics 12'. The channel electronics 12' delays modulation of the recording laser beam relative to the modulation of the preheat laser beam, so that each of the preheated media regions 36 created by laser beam pulses from the preheat laser are subsequently illuminated by recording laser beam pulses at the recording spot and thereby heated above the critical temperature, forming recorded marks 26'. The extent of critical heating is constrained by the limited width and length of the preheated media regions. Therefore, the length and width variability of the recorded marks is reduced.

Figure 6:
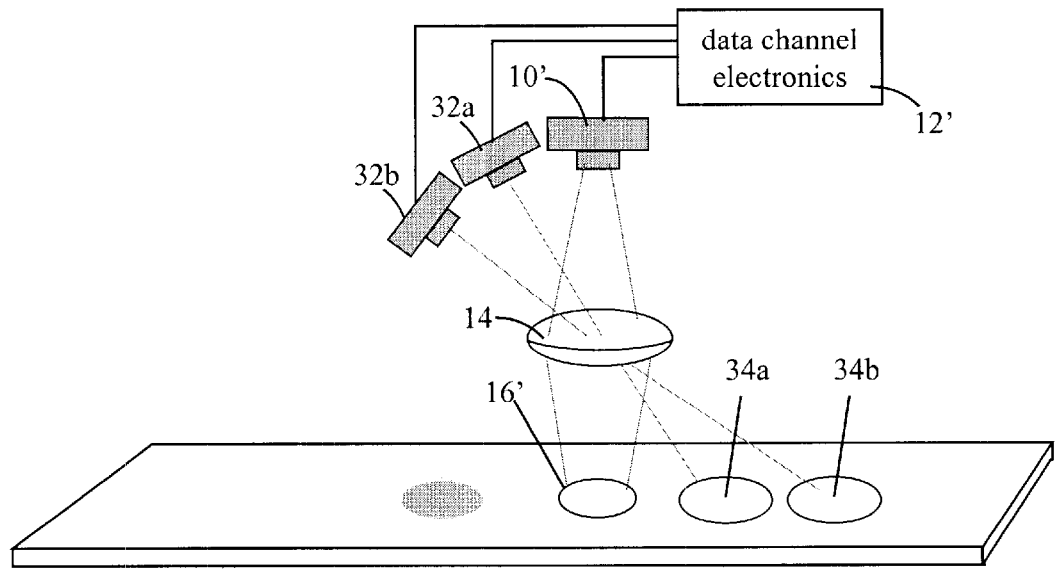
FIG. 6 shows another embodiment of the present invention.

It will be appreciated that additional synchronized preheat lasers may be employed if additional sensitivity enhancement is required. In the apparatus of FIG. 6, two preheat lasers 32a and 32b produce beams that are aligned to illuminate two preheat spots 34a and 34b upstream from the recording spot 16'. Both preheat laser beams are modulated by the data channel electronics 12' and synchronized so that they both preheat the regions that will be raised to the critical recording temperature by pulses of the recording laser at the recording spot 16'.

Figure 7:
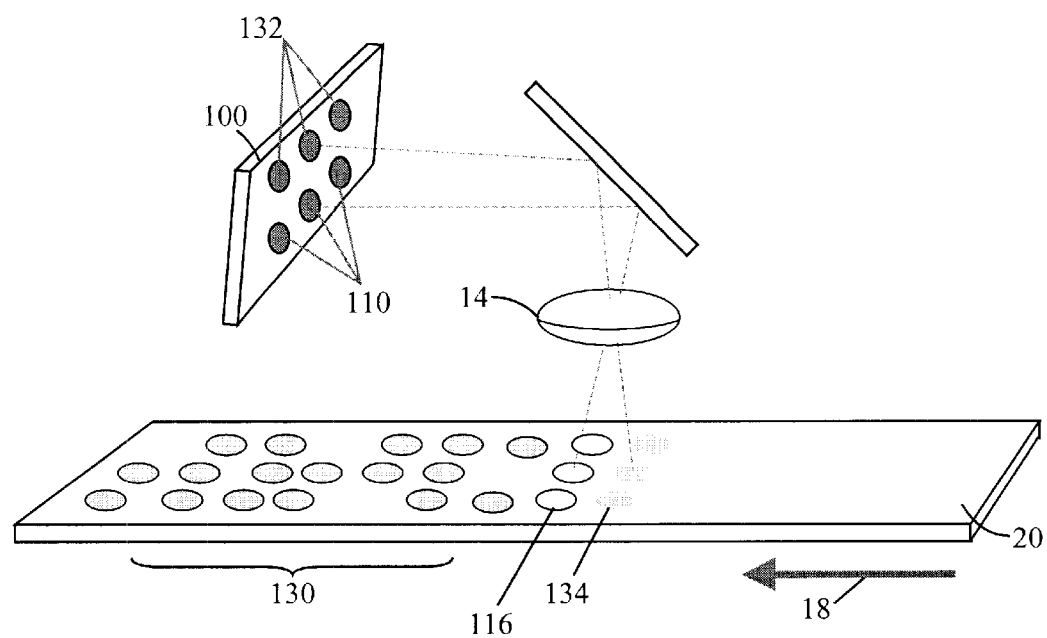
FIG. 7 shows a further embodiment of the invention for multitrack recording.

FIG. 7 shows a plurality of apparatus, each of which synchronizes preheated beams for simultaneously recording multiple tracks. This arrangement is implemented using a two-dimensional VCSEL array that includes a line of recording laser elements 110 and a neighboring line of preheat laser elements 132. Beams from the recording lasers are focused by a focusing lens 14 creating a line of recording spots 116 on the surface of an optical recording medium 20 that scans in a direction 18 with respect to the recording spots. Beams from the preheated lasers 132 are also focused by the focusing lens, forming a line of preheat spots 134, one preheat spot directly upstream from each recording spot. The modulation of each recording laser beam is sychronized with the corresponding preheat laser beam so that both lasers heat the same regions of the recording medium, with the result that recorded marks 130 are formed downstream from each recording spot.

The invention has been described in detail with particular reference to certain preferred embodiments thereof, but it will be understood that variations and modifications can be effected within the spirit and scope of the invention.

PARTS LIST 10 recording laser
10' recording laser
12 data channel electronics
12' data channel electronics
14 focusing lens
16 recording spot
16' recording spot
18 scanning velocity
20 optical recording medium
22 recorded marks
24 recorded marks
26 recorded marks
26' recorded marks
28 heater
30 heated media zone
30' heated media zone
32 preheat laser
32a preheat laser
32b preheat laser
34 preheat spot
34a preheat spot
34b preheat spot
36 preheated media regions
100 VCSEL array
110 recording lasers
116 recording spots
130 recorded marks
132 preheat lasers
134 preheat spots

What is claimed is:

1. A method for optical data recording, comprising:

a) focusing a preheat laser beam and a recording laser beam onto an optical recording medium, forming a preheat focused spot and a recording focused spot having nearly equal sizes;

b) providing relative scanning motion between the optical recording medium and the recording focused spot in a direction parallel to the displacement from the preheat focused spot to the recording focused spot at a velocity sufficient to prevent thermal diffusion from the optical recording medium during the transit of the medium from the preheat focused spot to the recording focused spot;

c) modulating the preheat laser beam according to a modulated data signal, thereby creating preheated zones on the media surface with temperatures less than a threshold for complete mark formation;

d) modulating the recording laser beam according to the modulated data signal, with a time delay equal to the separation between the preheat focused spot and the recording focused spot divided by the scanning velocity; and e) causing the recording laser beam to illuminate the recording focused spot with sufficient power to raise the temperatures of each preheated zone above the threshold for complete mark formation, creating a track of permanent recorded marks.

2. A method for simultaneous multitrack optical data recording which includes using the method of claim 1 for recording each track.

3. A method for optical data recording, comprising:

a) focusing two or more preheat laser beams and a recording laser beam onto an optical recording medium, forming a line of focused spots all having nearly equal sizes, with the recording focused spot illuminated by the recording laser beam at one end of the line;

b) providing relative scanning motion between the optical recording medium and the recording focused spot in a direction parallel to the line from the preheat focused spots to the recording focused spot at a velocity sufficient to prevent thermal diffusion from the optical recording medium during the transit of the medium from the preheat focused spots to the recording focused spot;

c) driving each laser beam according to a single modulated data signal, advancing the modulation of each preheat laser beam by a time equal to the separation between the preheat focused spot and the recording focused spot divided by the scanning velocity;

d) driving each preheat laser beam to illuminate the corresponding preheat focused spot with sufficient power to raise the temperature of preheated zones on the media surface without exceeding a threshold for complete mark formation; and e) driving the recording laser beam to illuminate the recording focused spot with sufficient power to raise the temperatures of each preheated zone above the threshold for complete mark formation, creating a track of permanent recorded marks.

4. A method for simultaneous multitrack optical data recording which includes using the method of claim 3 for recording each track.

5. Apparatus for optical data recording, comprising:

a) a recording laser source that produces a recording laser beam and at least one preheat laser source, each such source producing a preheat laser beam;

b) optical means for focusing the recording laser beam and the preheat laser beam(s) to form a line of focused spots on the surface of an optical recording medium, with the recording laser focused spot at one end;

c) transport means for providing relative scanning motion between the optical recording medium and the recording focused spot in a direction parallel to the displacement from the preheat focused spots to the recording focused spot at a velocity sufficient to prevent diffusion of the optical recording medium during the transit of the medium from the preheat focused spots to the recording focused spot;

d) modulation means for driving the recording laser beam and preheat laser beam(s) according to a desired mark pattern; and e) delay means for providing a relative delay(s) between modulation of the preheat laser beam(s) and the recording laser beam, each delay equal to the separation between the preheat focused spot and the recording focused spot, divided by the scanning velocity.

6. The apparatus of claim 5 wherein the recording laser source and preheat laser source(s) are provided as elements of a VCSEL array.

7. The invention as set forth in claim 5 further including a plurality of apparatus for simultaneous multitrack optical data recording wherein each apparatus records a separate track.

8. The invention of claim 7 wherein the recording laser source and preheat laser source(s) of the each apparatus is an element of a VCSEL array.

* * * * *